Patented Oct. 22, 1940

2,218,997

UNITED STATES PATENT OFFICE 2,218,997

AGENT FOR IMPROVING LUBRICATING OILS

Jones I. Wasson, Elizabeth, N. J., assignor to Standard Oil Development Company, a corporation of Delaware No Drawing. Application September 15, 1937, Serial No. 163,918

10 Claims. (Cl. 260—139)

The present invention relates to an improved addition agent for lubricating oils and to a method for producing said agent and likewise to a lubricating oil containing the addition agent being adapted for use at high temperature, for example, as a motor oil by reason of its resistance to oxidation, sludge formation and other forms of deterioration. This application is a continuation in part of application No. 758,437, filed December 20, 1934, issued February 22, 1938 as U. S. Patent 2,108,954 to Jones I. Wasson, on the subject of lubricating compositions. The invention will be fully understood from the following description.

Motor oils and other lubricants which are subjected to elevated temperatures show deterioration by oxidation, sludge formation and the like. Such deterioration may be checked by the addition of certain materials, for example, oxidation inhibitors for reducing the oxidation rate and dispersing agents for preventing or reducing sludge formation. Most of these agents useful for one particular purpose are undesirable from another point of view. For example, most of the oxidation inhibitors raise the Sligh value of an oil. In the present case a new addition agent has been prepared which has the remarkable ability to check all of the various known forms of deterioration and without in any way interfering with or diminishing the value of the oil for lubricating purposes.

The addition agent which forms the principal feature of the present invention is produced from various high boiling unsaturated aliphatic materials, among which are cracked paraffin waxes, heavy unsaturated paraffin wax and long chain olefin compounds. Unsaturated fatty acids and esters may also be employed such as the glyceryl or glycol esters, monohydric alkyl esters, alcohols and the like. The above materials are all characterized by long hydrocarbon chains, for example, containing more than 10 carbon atoms.

Such unsaturated raw materials are usually secured by either cracking, dehydrogenation, dehydration or the like of the saturated compound. The preferred raw material is a cracked wax having more than 10 carbon atoms in the molecule. These materials are then caused to react with sulphur chloride so as to form a product containing both sulphur and chlorine. The sulphur is believed to be in the form of polysulphide and is corrosive when tested with a bright copper strip in the usual manner, but as will be noted, the subsequent treatment renders the material non-corrosive. The reaction with sulphur chloride is accomplished in the well known way, preferably at ordinary temperatures and with cooling since heat is evolved. The reaction is not permitted to proceed to such a degree as to produce solid materials but is cut short when the product is still liquid and soluble in mineral oils. Ordinarily, the reaction may be accomplished in 1 to 4 hours at a temperature not above about 300° F. and the reaction may be brought to a stop either by a careful control of the amount of sulphur chloride added or by the addition of alcoholic alkali or other such materials which destroy the sulphur chloride.

The intermediate product obtained in the ways outlined above is then steamed, preferably in the presence of alkali so as to remove at least a part of the chlorine and to replace this with hydroxyl groups. This treatment also removes or converts the "corrosive" sulphur to a "non-corrosive" variety so that the final compound will not tarnish copper. The chlorine may be entirely removed but if it is reduced to a small quantity, say less than .5%, results are quite satisfactory. It will be understood that more chlorine than this may be allowed to remain but it is not particularly advantageous, in fact it is believed to be preferable to remove the chlorine to as complete a degree as possible. The presence of hydroxyl groups is indicated by the acetyl value.

The final product may be purified in any desired manner and in the end consists of an aliphatic hydroxy sulfide or polysulfide soluble in mineral lubricating oils and fluid at ordinary temperatures.

The oils to which the above substance may be advantageously added are high boiling petroleum fractions, particularly the lubricating oils produced by ordinary refining methods such as distillation, acid, alkali and/or clay treatment or the more highly refined oils such as produced by hydrogenation, destructive hydrogenation, heavy acid treatment or solvent extraction. It has been observed that the more highly refined oils show a greater tendency toward rapid oxidation and this is effectively checked by the addition of relatively small amounts of the agents prepared in the manner described above. The amount may vary considerably with the particular oils but it is usually found that 1% more or less gives satisfactory results.

The addition agents may be added also to high boiling fuels and insulating oils which are subjected to high temperatures.

As an example of the production of the addition agent and its effects, the following may be considered:

Paraffin wax is cracked by heat at 810° F. liquid phase and under 50# pressure to give a total cracked product boiling from about 200 to 650° F. and about 50 to 60% olefin content.

To 100 parts by weight of the cracked wax is added 10 parts by weight of sulphur mono-chloride and the temperature is held down below 200° F. during the reaction period of about 1 hour. The product recovered is fluid, soluble in mineral oils and contains about 2% by weight of each of the elements chlorine and sulphur.

The intermediate obtained above is then refluxed or steamed over alcoholic soda for one-half hour, dried and finally recovered. It has the following analysis:

| | Per cent |
|---|---|
| Carbon | 82.67 |
| Hydrogen | 14.12 |
| Sulphur | 2.07 |
| Chlorin | 0.35 |
| Total | 99.21 |
| Acetyl value | 51.2 |

To one sample of a well refined S. A. E. 50 grade lubricating oil is added 1% of the above agent and the rate of oxidation is determined and compared with that of a blank sample of the same oil which does not contain the addition agent. The test is made by continuously passing oxygen through a 10 cc. sample of oil at a definite rate while maintaining the sample at 200° C. The oxygen is passed through a closed system and the amount dissolved is determined by difference between the volume originally present and the undissolved oxygen which is measured at 15 minute intervals. The results are as follows:

| Sample | Oxidation rate @ 200° C. cc. $O_2$ absorbed/10 cc. per 15 minutes |
|---|---|
| S. A. E. 50 | 132—116—82—49 |
| Same+1% hydroxy sulfide | 17—20—15—15 |

The Sligh values of the above samples determined according to the method given in A. S. T. M. Report D-2, P. 22 (1927) except that the time of heating is 24 hours instead of the usual 2½ hours were 6.7 for the blank and 2.2 for the same containing the addition agent.

Another sample of the addition agent was prepared in the same general manner indicated above and when added to a highly refined lubricating oil of high oxidation rate in proportion of 1% showed an oxidation rate of 37—38—28—32. The Sligh value was 1.2, less than 20% of that of the unblended oil.

An additional sample of aliphatic hydroxy sulfide was prepared in the following manner: 8 parts by volume of sulphur monochloride was added to 100 parts by volume of a cracked wax secured in the manner as outlined in the above example. This mixture was initially heated at a temperature of from 200 to 225° F. and then the temperature was raised to about 300° F. and the mixture maintained at 300° F. for approximately 3 to 4 hours. The mixture was then cooled and filtered in order to remove any solid material. The filtered product was then steam distilled, resulting in a distillate yield of approximately 70%. The product secured from the steam distillation was then refluxed for about 2 to 3 hours with an alcohol potassium hydroxide solution having a composition of approximately 50% alcohol, 50% water and 3½% alkali.

1% of the cracked wax sulfide prepared in accordance with the above method was added to a standard lubricating oil and the oxidation rate determined with the following results:

| | Oxidation rate @ 200° C. cc. $O_2$ absorbed/10 cc. per 15 minutes |
|---|---|
| Standard lubricating oil | 215 |
| Standard lubricating oil+1% of cracked wax sulfides | 51, 37, 16, 18 |

In the above description, the agent is described as an aliphatic hydroxy sulfide or polysulfide and by this it is meant that the hydroxyl and sulphur groups are attached directly to the aliphatic chain. It is definitely intended to include under this term materials including cyclic aromatic or naphthenic rings, which may or may not be substituted, providing that the sulphur and hydroxyl groups are attached directly to the aliphatic chain as indicated. The oils may be blended with other known materials to increase oiliness, thickeners, metallic soaps, dyes, pour point inhibitors or the like, as in the case of any other mineral oil.

The present invention is not to be limited by any theory of the method by which the agents are produced or any theory of their activity for the purposes disclosed, but only by the following claims in which it is desired to claim all novelty inherent in the invention.

I claim:

1. Process of producing oil soluble aliphatic hydroxy sulfides comprising treating cracked wax with a sulphur halide at a temperature not exceeding 300° F. and refluxing the resulting product with an alcoholic alkali.

2. Process in accordance with claim 1 in which said cracked wax has at least 10 carbon atoms and said sulphur halide is sulphur monochloride.

3. Process for producing oil soluble aliphatic hydroxy sulfides comprising treating olefin compounds having at least 10 carbon atoms with a sulphur halide at a temperature not exceeding 300° F. and refluxing the resulting product with an alcoholic alkali.

4. Product prepared in accordance with the process of claim 7.

5. Product prepared in accordance with the process of claim 1.

6. Product prepared in accordance with the process of claim 3.

7. The process of producing oil-soluble aliphatic hydroxy sulfides which comprises subjecting paraffin wax to liquid phase cracking under pressure and at cracking temperatures to form a product containing between 50 and 60% of long chain olefins, treating the cracked product with sulfur chloride at a temperature not exceeding 300° F. and refluxing the resulting product with dilute alcoholic alkali.

8. Product consisting essentially of an aliphatic hydroxy-sulfide in which the hydroxy radical and the sulfur are attached directly to the aliphatic chain.

9. Product according to claim 8 which is soluble in mineral oils and is fluid at ordinary temperatures.

10. Product consisting essentially of an aliphatic hydrocarbon chain having directly attached thereto an hydroxy group and a sulfide group, and including a cyclic group selected from the class consisting of aromatic and naphthenic rings.

JONES I. WASSON.